United States Patent
Yabe

(10) Patent No.: US 7,462,805 B2
(45) Date of Patent: Dec. 9, 2008

(54) FOCUS DETECTION APPARATUS HAVING A LUMINOUS FLUX DEFORMATION MEMBER

(75) Inventor: Masato Yabe, Hachioji (JP)

(73) Assignee: Olympus Corporation, Tokyo (JP)

( * ) Notice: Subject to any disclaimer, the term of this patent is extended or adjusted under 35 U.S.C. 154(b) by 166 days.

(21) Appl. No.: 11/486,248

(22) Filed: Jul. 13, 2006

(65) Prior Publication Data

US 2007/0012859 A1  Jan. 18, 2007

(30) Foreign Application Priority Data

Jul. 13, 2005  (JP)  ............................. 2005-204724

(51) Int. Cl.
*G01J 21/26* (2006.01)

(52) U.S. Cl. ................. 250/201.3; 250/201.4; 359/381; 359/368

(58) Field of Classification Search ... 250/201.1–201.4; 359/385, 388, 389, 390, 381, 368
See application file for complete search history.

(56) References Cited

U.S. PATENT DOCUMENTS

| | | | | |
|---|---|---|---|---|
| 5,317,142 A | * | 5/1994 | Noda et al. | 250/201.4 |
| 5,432,330 A | * | 7/1995 | Nakamura | 250/201.4 |
| 5,483,079 A | * | 1/1996 | Yonezawa | 250/559.29 |
| 6,649,893 B2 | * | 11/2003 | Fujimoto et al. | 250/201.2 |
| 2004/0113043 A1 | * | 6/2004 | Ishikawa et al. | 250/201.4 |
| 2005/0122577 A1 | * | 6/2005 | Fujimoto et al. | 359/383 |
| 2007/0164194 A1 | * | 7/2007 | Kurata et al. | 250/201.4 |

FOREIGN PATENT DOCUMENTS

| | | |
|---|---|---|
| JP | 60-042725 | 3/1985 |
| JP | 62-143010 | 6/1987 |
| JP | 05-045573 | 2/1993 |

* cited by examiner

*Primary Examiner*—Georgia Y Epps
*Assistant Examiner*—Tony Ko
(74) *Attorney, Agent, or Firm*—Scully, Scott, Murphy & Presser, P.C.

(57) ABSTRACT

The present invention provides a focus detection apparatus. In the focus detection apparatus, a luminous flux deformation member is provided to deform a sectional shape of a luminous flux emitted from a light source, and thereby a light quantity difference and a light intensity difference are decreased in light beams which are emitted to a sample surface and received by a photodetector even if objective lenses to be used are differ from each other in a pupil diameter. Consequently, the sample is irradiated with a single spot or multi spots to determine whether or not a focused state is obtained.

19 Claims, 6 Drawing Sheets

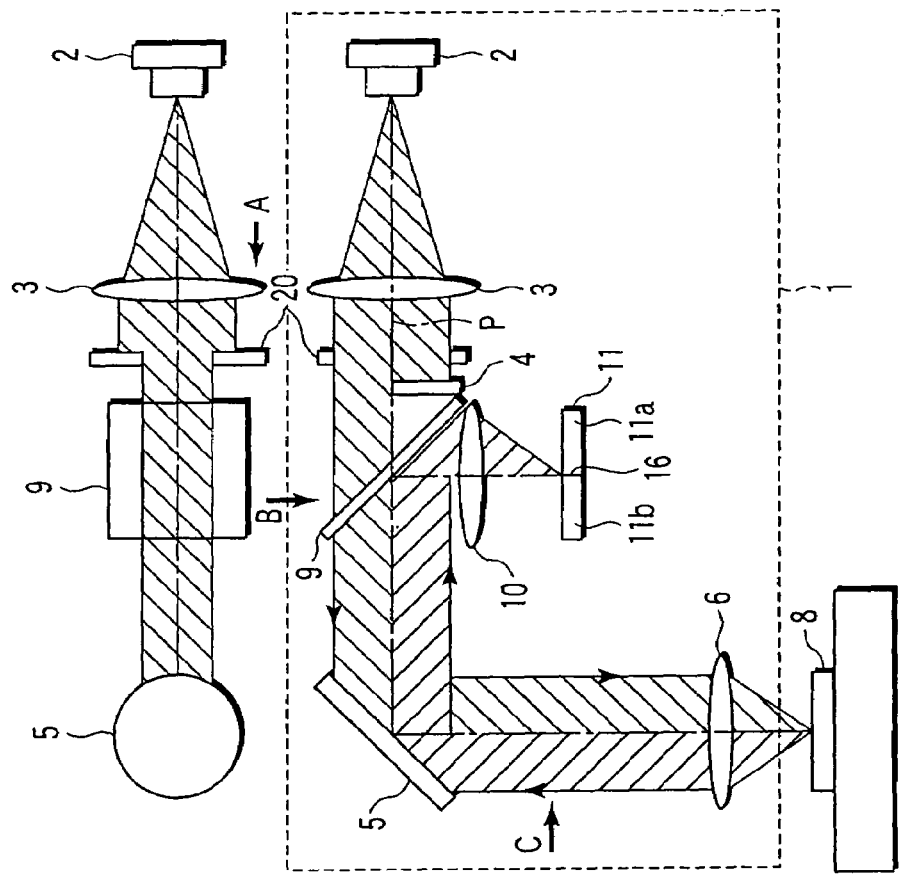
FIG. 1B
FIG. 1A
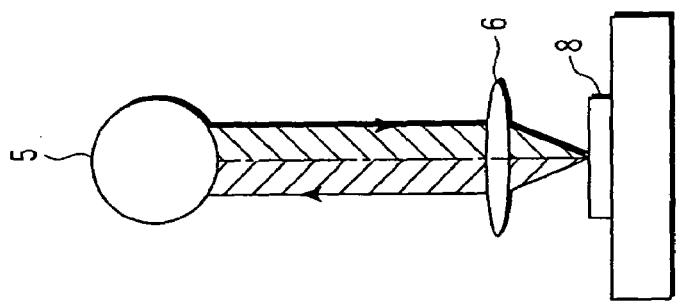
FIG. 1C

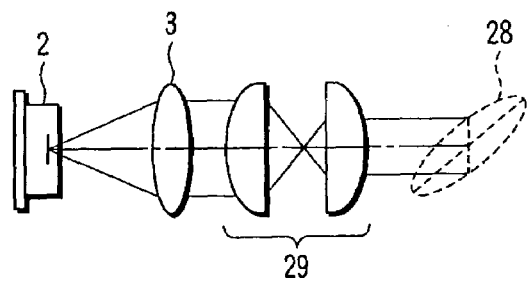
FIG. 9
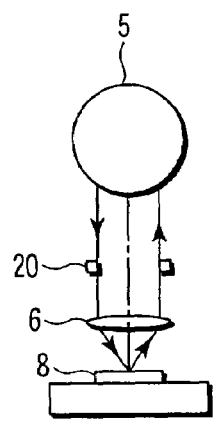
FIG. 10C
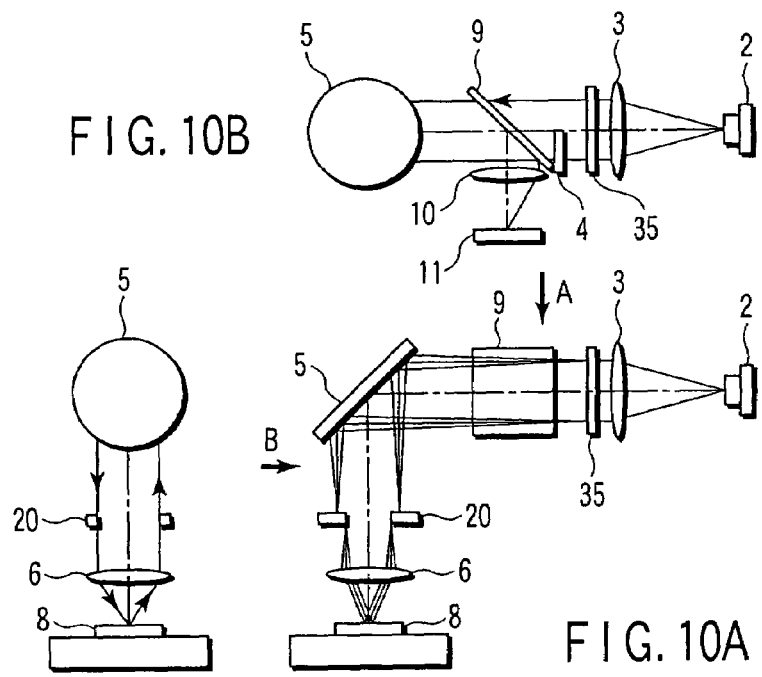
FIG. 10B
FIG. 10A
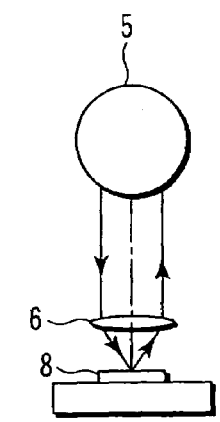
FIG. 11C
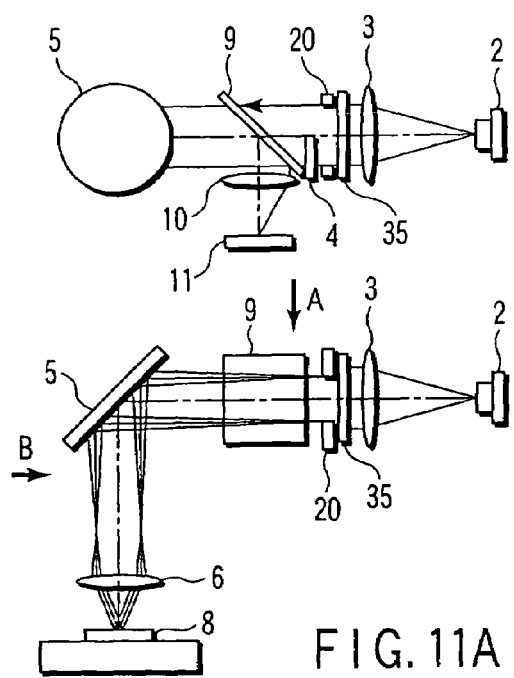
FIG. 11B
FIG. 11A

FOCUS DETECTION APPARATUS HAVING A LUMINOUS FLUX DEFORMATION MEMBER

CROSS-REFERENCE TO RELATED APPLICATIONS

This application is based upon and claims the benefit of priority from prior Japanese Patent Application No. 2005-204724, filed Jul. 13, 2005, the entire contents of which are incorporated herein by reference.

BACKGROUND OF THE INVENTION

1. Field of the Invention

The present invention relates to a focus detection apparatus which is mounted on an optical instruments, such as a microscope and an optical measuring machine, to detect a focus of a sample.

2. Description of the Related Art

Conventionally, there is known a microscope provided with a focus detection apparatus which automatically adjusts a focus on a sample to obtain the proper focus. Such a focus detection apparatus is disclosed in, for example, Jpn. Pat. Appln. KOKAI Publication No. 60-042725. FIG. 12 schematically shows a configuration of the disclosed focus detection apparatus 1. FIGS. 13A, 13B and 13C are views showing a positional relationship between the sample, an objective lens, and a photodetector, and an image forming state when collecting light reflected from the sample onto a light receiving surface.

Particularly, FIG. 13A shows a light collecting state of the reflected light in the case where the sample is located nearer than a focal position of the objective lens (near focus state). FIG. 13B shows a light collecting state of the reflected light in the case where the sample is located at the focal position of the objective lens (focused state). FIG. 13C shows a light collecting state of the reflected light in the case where the sample is located farther than the focal position of the objective lens (far focus state).

In the disclosed focus detection apparatus 1, as shown in FIGS. 13A to 13C, a position and a size of an image 17 focused on a photodetector 11 are varied according to a change in relative distance between a sample 8 and an objective lens 6, which changes amplitudes of output signals output from light receiving surfaces 11a and 11b. In the focus detection apparatus 1, a signal processing system (not shown) which receives the output signals can determine a focus direction and focused and defocused states.

However, a pupil diameter of an objective lens depends on a type and magnification of the objective lens. For this reason, a sufficient luminous flux emitted from a light source is not always incident to the pupil diameter of the objective lens. That is, the sufficient light reflected from the sample necessary to detect the focus is not always received by a light receiving surface.

For example, when a diameter of the luminous flux emitted from the light source unit is smaller than the pupil diameter of the objective lens, an object-side numerical aperture (NA) of the emitted luminous flux becomes smaller as compared with the object-side numerical aperture of the objective lens. As a result, a movement amount of a representative position of a spot image is decreased on the light receiving surface with respect to a relative distance movement between the objective lens and the sample. That is, detection accuracy drops off because the focal depth is increased.

When the diameter of the luminous flux emitted from the light source unit is larger than the pupil diameter of the objective lens, a part of the luminous flux is cut off by the pupil of the objective lens. Therefore, a light quantity which can effectively be utilized is decreased to lower the detection accuracy.

The problem created by the difference in pupil diameter between the objective lenses will be described with reference to FIGS. 14A, 14B and 14C. FIGS. 14A, 14B and 14C show the difference in pupil diameter between the objective lenses based on the case where the pupil diameter of the objective lens becomes maximum. These figures show the difference in size of the light-receiving-side luminous flux diameter which depends on the size of the pupil diameter.

FIG. 14A is a view showing a state in which, for example, in an objective lens 6 having the largest pupil diameter 18, a luminous flux $S_1$ having an optimum diameter for sufficiently satisfying the largest pupil diameter 18 is transmitted through the objective lens 6 after the luminous flux $S_1$ is transmitted through the objective lens 6 and reflected from the sample 8. FIG. 14B is a view showing a state in which the luminous flux $S_1$ is transmitted through, for example, an objective lens 6 having the smallest pupil diameter 19 after the luminous flux $S_1$ is transmitted through the objective lens 6 and reflected from the sample 8. As shown in FIG. 14B, a part of the luminous flux $S_1$ is cut off, the remaining part of luminous flux $S_1$ is transmitted through the objective lens 6 and transmitted through the objective lens 6 after reflected from the sample 8.

In the state in which the luminous flux $S_1$ is transmitted through the objective lens 6 after the luminous flux S1 is transmitted through the objective lens 6 and reflected from the sample 8, the light quantity of the luminous flux $S_1$ transmitted through the objective lens 6 having the smallest pupil diameter 19 is smaller than that of the luminous flux $S_1$ transmitted through the objective lens 6 having the largest pupil diameter 18. Therefore, lack of the light quantity is generated in the light receiving surfaces 11a and 11b. Additionally, light quantity loss of the laser beam focused on the light receiving surfaces 11a and 11b of the photodetector 11 is easily occurs.

For example, as shown in FIG. 14C, it is assumed that the largest pupil diameter 18 is set at 9 mm while the smallest pupil diameter 19 is set at 3 mm. When the light quantity ratio is obtained between the two, the light quantity ratio becomes 9:1 because the light quantity ratio is equal to an area ratio in the pupil surface. Thus, when the light quantity ratio is large, the quantity of light received by the light receiving surfaces 11a and 11b becomes insufficient. The quantity of effectively usable light received by the light receiving surfaces 11a and 11b becomes further insufficient under such additionally adverse conditions that the objective lens 6 having the smallest pupil diameter 19 is used to perform the focus detection operation to the sample 8 having low reflectivity.

The focus detection apparatus 1 includes an integrating circuit which processes a signal output from the photodetector 11. Conventionally, a time constant and an integration time of the integrating circuit are switched in the focus detection apparatus 1. The focus detection apparatus 1 performs an electrical amplification process to the weak signal output from the photodetector 11 by the switching between the time constant and the integration time. In addition, the focus detection apparatus 1 generates a focus error signal through the amplification process. However, there is a limitation in the amplification process. When the amplification process exceed the limit, a noise component such as temperature change which is varied in time series is added to the focus error signal. As a result, the signal-to-noise ratio decreases in the focus error signal to lower the focus accuracy.

The above problem has been serious in optical instruments such as a microscope in which a magnification of an objective lens is frequently switched between the low magnification and the high magnification.

Therefore, for example, Jpn. Pat. Appln. KOKAI Publication No. 62-143010 discloses a focus detection apparatus including a light source and light receiving means. The light source projects light onto an object through a neighbor of a pupil of an objective lens along an optical path which corresponds to one of optical paths on an optical axis in a focused state of the objective lens. The light receiving means receives the light reflected from the object through the objective lens. In the focus detection apparatus which makes focus determination by detecting displacement of a position of the light incident to the light receiving means, optical path switching means for switching the light from the light source so as to correspond to another optical path on the optical axis is provided between the light source and the objective lens, and a luminous flux is projected so as to coincide with the pupil diameter of the objective lens by moving the optical path switching means in an optical axis direction.

Jpn. Pat. Appln. KOKAI Publication No. 05-045573 discloses a similar focus detection apparatus.

In a configuration of the focus detection apparatus, measurement luminous fluxes emitted from at least two measurement light sources are received by light receiving means arranged in a peripheral portion of a pupil of an objective lens, and focus determination is made by detecting displacement of a position of the light incident to the light receiving means. Because at least the two measurement light sources are provided, any one of the measurement light sources is selectively used according to the magnification of the objective lens.

BRIEF SUMMARY OF THE INVENTION

According to one aspect of the present invention, there is provided a focus detection apparatus comprising: a light source which emits a luminous flux for focus detection to a sample; a photodetector which receives the luminous flux through an objective lens, the luminous flux being reflected from the sample; a focus detection unit which detects a focus based on a quantity of received light of the luminous flux received by the photodetector; and a luminous flux deformation unit which decreases a difference between the amounts of light received in the photodetector despite a size of a pupil diameter of the objective lens by deforming a sectional shape of the luminous flux incident to the objective lens arranged on an optical axis of the luminous flux.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A shows a schematic configuration of an entire focus detection apparatus according to a first embodiment of the present invention;

FIG. 1B is a top view of FIG. 1A when the apparatus is viewed from a direction of an arrow B;

FIG. 1C is a side view of FIG. 1A when the apparatus is viewed from a direction of an arrow C;

FIG. 9 shows a configuration in which a cylindrical lens system is arranged instead of an anamorphic optical system in the third embodiment;

FIG. 10A shows a schematic configuration in the case of using a multi-spot method in a focus detection apparatus according to a fourth embodiment of the present invention;

FIG. 10B is a view of FIG. 10A when the apparatus is viewed from a direction of an arrow A;

FIG. 10C is a view of FIG. 10A when the apparatus is viewed from a direction of an arrow B;

FIG. 11A shows a schematic configuration in the case of using the multi-spot method in a focus detection apparatus according to a fifth embodiment of the present invention;

FIG. 11B is a view of FIG. 11A when the apparatus is viewed from a direction of an arrow A;

FIG. 11C is a view of FIG. 11A when the apparatus is viewed from a direction of an arrow B;

DETAILED DESCRIPTION OF THE INVENTION

Figure 12:
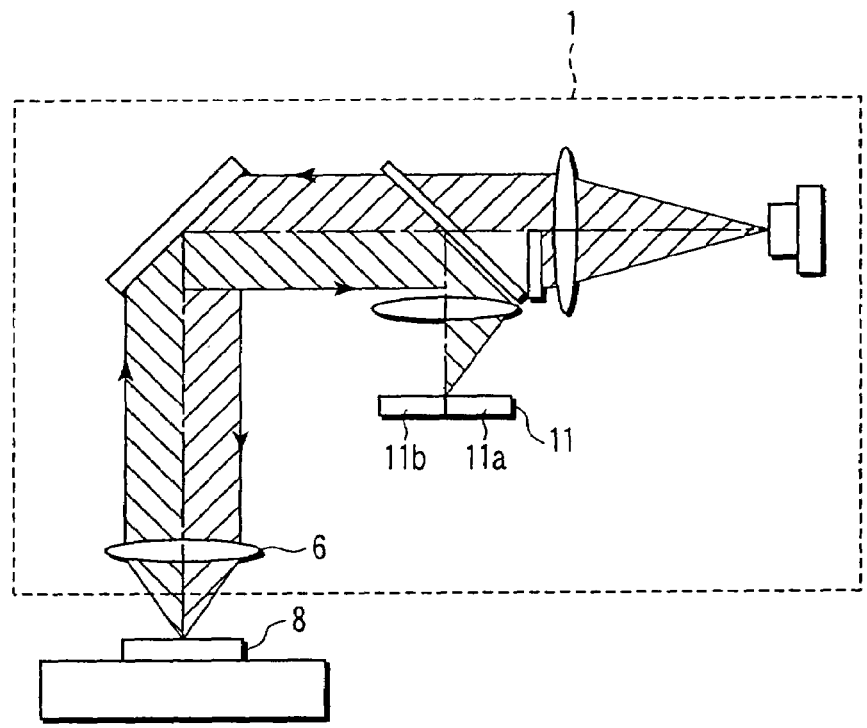
FIG. 12 shows a schematic configuration of a conventional apparatus.

A first embodiment of the present invention will be described in detail with reference to the drawings. In the following drawings, the same components as those of FIG. 12 are designated by the same numerals, and detailed description will be omitted.

Figure 2:
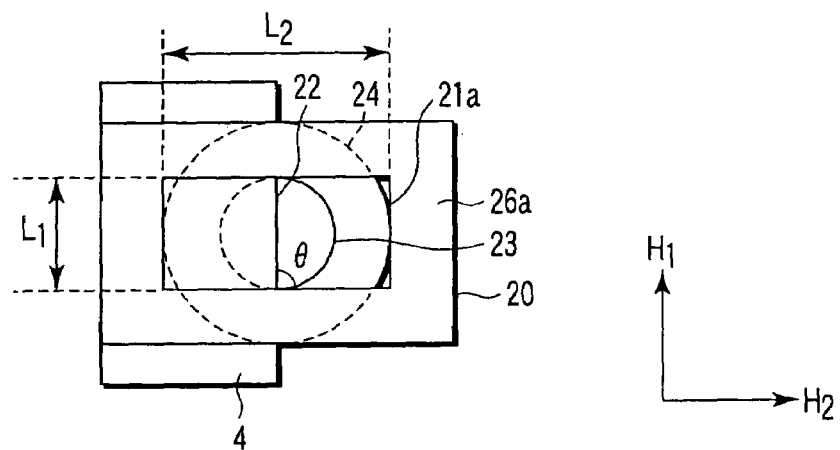
FIG. 2 is a front elevation showing a luminous flux deformation member when viewed from a direction of an arrow A of FIG. 1.

FIG. 1A shows an entire configuration of a focus detection apparatus 1 according to the first embodiment, FIG. 1B is a top view of FIG. 1A when the apparatus 1 is viewed from a direction of an arrow B, and FIG. 1C is a side view of FIG. 1A when the apparatus 1 is viewed from a direction of an arrow C. FIG. 2 is a sectional view showing a luminous flux deformation member when viewed from a direction of an arrow A of FIG. 1. The configuration of the focus detection apparatus 1 has the feature in that a luminous flux deformation member 20 is arranged at a position of conjugation with a pupil of an objective lens 6 or near the position.

A light source 2 is provided with, for example, a semiconductor laser which emits a laser beam having an infrared wavelength. The semiconductor laser is for example, a laser diode (LD). A collimator lens 3 converts the laser beam emitted from the light source 2 to a parallel luminous flux. The luminous flux deformation member 20 cuts off only a part of the parallel luminous flux and allows a remaining part of parallel luminous flux to pass therethrough. Alternatively the luminous flux deformation member 20 allows the parallel luminous flux to pass therethrough. The luminous flux deformation member 20 is arranged at a position of conjugation with the pupil of the objective lens 6 or near the position. A shutter 4 (knife edge) cuts off a half of the parallel luminous flux having passed through the luminous flux deformation member 20, by a line passing through an optical axis P. The remaining part of luminous flux which is not cut off by the shutter 4 is transmitted through a half mirror 9. The luminous flux transmitted through the half mirror 9 is reflected toward a direction of the objective lens 6 by a dichroic mirror 5. At this point, the luminous flux passes through a right optical path of the drawings with respect to the optical axis P. The objective lens 6 collects the luminous flux on the sample 8 while the luminous flux is formed in a spot shape. The light reflected from the sample 8 passes through a left optical path of the drawings with respect to the optical axis P, and the light is transmitted through the objective lens 6 again. Then, the light is reflected downward by the dichroic mirror 5 and the half mirror 9. A condensing lens 10 arranged below the half mirror 9 collects the reflected light. A photodetector 11 arranged on the optical axis P receives the reflected light collected. The photodetector 11 has two light receiving surfaces 11a and 11b which meet at a dual partitioning boundary line 16. At least one of the light receiving surfaces 11a and 11b receives the reflected light. The dual-partitioned light receiving surfaces 11a and 11b output an output signal to a signal processing system (not shown) according to the light quantity of the reflected light received. The signal processing system adjusts the focus based on the output signal.

The luminous flux deformation member 20 shown in FIG. 2 includes a light cutting off member 26a which cuts off the luminous flux and an aperture 21a which allows the luminous flux to pass therethrough. For example, the luminous flux deformation member 20 has a single-slit structure. In the case where an objective lens having a large pupil diameter and an objective lens having a relatively small pupil diameter are used, the luminous flux deformation member 20 decreases a difference between quantities of light received by respective light receiving surfaces.

In the luminous flux deformation member 20, preferably a dimension $L_1$ of a short side of the aperture 21a is equal to at least the smallest pupil diameter 23 of the objective lens 6 (generally high-magnification objective lens) which is used in conjunction with the focus detection apparatus 1.

It is preferable that the dimension $L_1$ of the short side is formed slightly larger than the smallest pupil diameter 23. Therefore, because an adjustment margin of the luminous flux deformation member 20 is increased, a user (operator) can easily adjust the position of the luminous flux deformation member 20.

Preferably, a dimension $L_2$ of a long side of the aperture 21a is caused to correspond to at least the largest pupil diameter 24 of the objective lens 6 (generally low-magnification objective lens) which is used in conjunction with the focus detection apparatus 1.

There is no limit to the dimension $L_2$ of the long side as long as the dimension $L_2$ of the long side is equal to the dimension of the largest pupil diameter 24 of the objective lens 6 or is larger than the dimension of the largest pupil diameter 24.

Positioning of the luminous flux deformation member 20 will be described below with reference to FIG. 2.

The user (operator) positions the luminous flux deformation member 20 such that an angle θ formed by a long-side direction $H_2$ of the aperture 21a (slit region) and a boundary line 22 between the light cutting off and aperture regions becomes orthogonal. The boundary line 22 is formed by the shutter 4 and a conjugate surface of the pupil of the objective lens 6. Then, the user (operator) moves the luminous flux deformation member 20 in a short-side direction $H_1$ of the slit region. At this point, the user (operator) moves the luminous flux deformation member 20 such that the whole of the smallest pupil diameter 23 of the objective lens 6 is accommodated in the slit region, and then, the user (operator) performs the positioning.

Finally, the user (operator) moves the luminous flux deformation member 20 in the long-side direction $H_2$ of the slit region. At this point, the user (operator) moves the luminous flux deformation member 20 such that the dimension $L_2$ of the long side of the slit region comes into contact with an outer shape of the largest pupil diameter 24 of the objective lens 6 or such that the dimension $L_2$ of the long side runs over from the dimension of the largest pupil diameter 24, and then, the user (operator) performs the positioning and fixation.

Next, an operation method of the first embodiment will be described.

Figure 3:
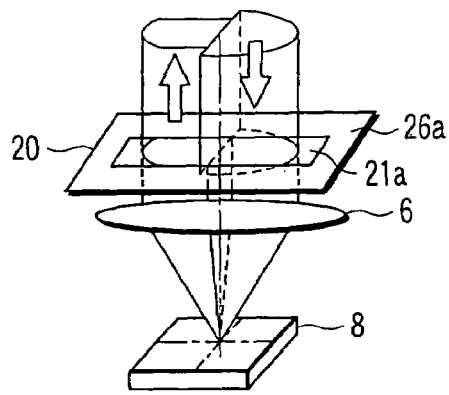
FIG. 3 is a view showing three-dimensionally a luminous flux in the neighbor on an objective lens side.

A laser beam emitted from the light source 2 is converted to a parallel luminous flux by the collimator lens 3, and the parallel luminous flux passes through the luminous flux deformation member 20. When the parallel luminous flux passes through the luminous flux deformation member 20, a part of the parallel luminous flux is cut off by the luminous flux deformation member 20 as shown in FIG. 3. In FIG. 3, the shutter 4 is not shown. In the configuration shown in FIG. 1, the light reflected from the sample 8 does not pass through the luminous flux deformation member 20 as shown in FIG. 3. FIG. 3 shows a case where the luminous flux deformation member 20 is arranged between the half mirror 9 and the dichroic mirror 5. The half of the luminous flux having passed through the luminous flux deformation member 20 is cut off by the shutter 4 by a line passing through the optical axis P.

The remaining part of luminous flux which is not cut off is transmitted through the half mirror 9, and the luminous flux is reflected downward by 90° with the dichroic mirror 5. Then, the luminous flux passes through the right optical path of the drawing with respect to the optical axis P, and is incident to the objective lens 6 to be transmitted through the objective lens 6. The luminous flux transmitted through the objective lens 6 is collected in a spot shape onto the sample 8 by the objective lens 6.

The light reflected from the sample 8 passes through the left optical path of the drawing with respect to the optical axis P again, and the luminous flux is incident to the objective lens 6 and is transmitted through the objective lens 6. Then, the transmitted light is reflected by the dichroic mirror 5 and the half mirror 9. Then, as shown in FIG. 4, the reflected light is collected on the photodetector 11 through the condensing lens 10.

A light receiving state in the photodetector 11 will be described below with reference to FIG. 4 and FIGS. 5A to 5C. FIG. 4 shows three-dimensionally a luminous flux which is transmitted through the condensing lens 10 and collected on the surface of the photodetector 11. FIGS. 5A to 5C show each light receiving position of the luminous flux according to the focused and defocused states in the light receiving surface of the photodetector 11.

Figure 4:
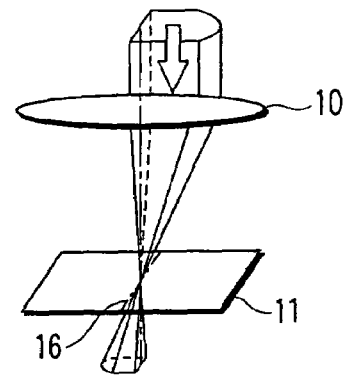
FIG. 4 is a view showing three-dimensionally a laser beam which is transmitted through a condensing lens and collected on a surface of a photodetector.
Figure 5A:
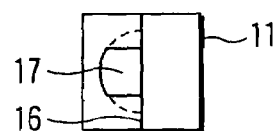
FIG. 5A is a view showing a light receiving position of a laser beam in a near focus state.
Figure 5B:
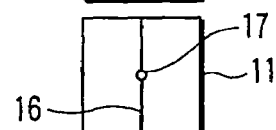
FIG. 5B is a view showing a light receiving position of a laser beam in a focused state.
Figure 5C:
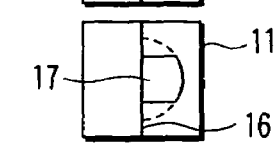
FIG. 5C is a view showing a light receiving position of a laser beam in a far focus state.

As shown in FIG. 4, the luminous flux is collected on the dual partitioning boundary line 16 in the light receiving surface of the photodetector 11.

A luminous flux collecting state in the photodetector 11 will be described below with reference to FIGS. 5A to 5C.

FIG. 5B shows a focused state. In FIG. 5B, the extremely small luminous flux is collected in a spot shape on the dual partitioning boundary line 16 in the light receiving surface of the photodetector 11. At this point, the luminous flux has a light quantity distribution which is symmetrical to the dual partitioning boundary line 16.

When the sample 8 is brought close to the objective lens 6 (a distance between the sample 8 and the objective lens 6 is narrowed), the spot is defocused as shown in FIG. 5A, and a defocused image 17 is formed in the left light receiving surface with respect to the dual partitioning boundary line 16. At this point, because a part of the luminous flux is lacked by the luminous flux deformation member 20, no light beam exists within a dotted line shown in FIG. 5A as compared with the case where the luminous flux deformation member 20 is not provided.

When the sample 8 recedes from the objective lens 6 (the distance between the sample 8 and the objective lens 6 is widened), the spot is defocused as shown in FIG. 5C, and the defocused image 17 is formed in the right light receiving surface with respect to the dual partitioning boundary line 16. Also in this case, no light beam exists within the dotted line shown in FIG. 5C as compared with the case where the luminous flux deformation member 20 is not provided.

Figure 13A:
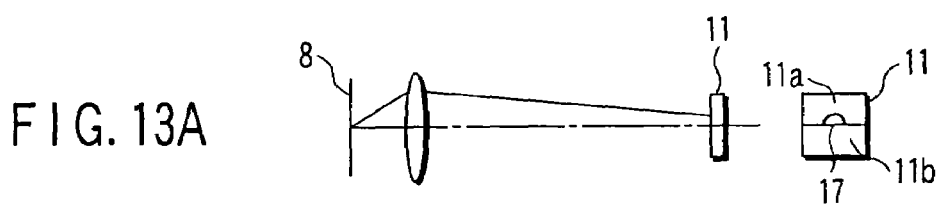
FIG. 13A shows a light collecting state of reflected light in the case where a sample is located nearer than a focal position of an objective lens (near focus state)
Figure 13B:
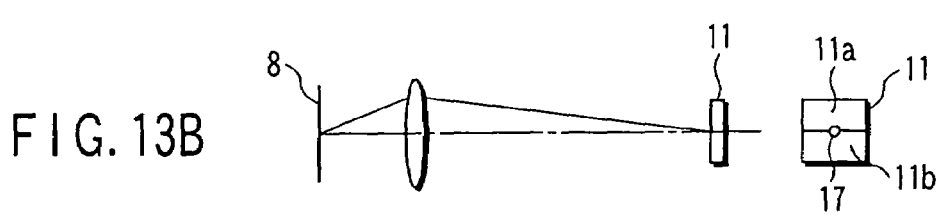
FIG. 13B shows a light collecting state of the reflected light in the case where the sample is located at the focal position of the objective lens (focused state)
Figure 13C:
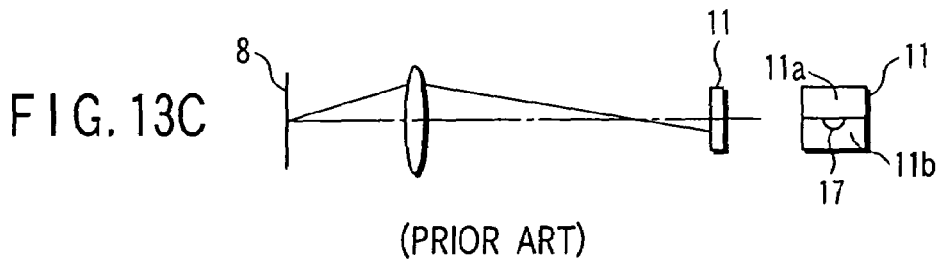
FIG. 13C shows a light collecting state of the reflected light in the case where the sample is located farther than the focal position of the objective lens (far focus state)
Figure 14C:
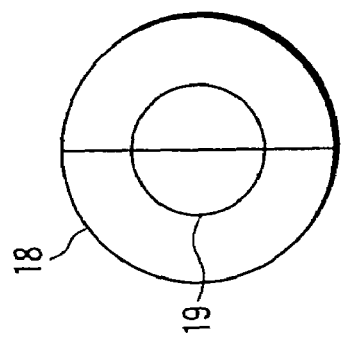
FIG. 14C shows comparison of the largest objective lens and the smallest objective lens, for example, in the case where the pupil diameter of the largest objective lens is set at 9 mm while the pupil diameter of the smallest objective lens is set at 3 mm.
Figure 14B:
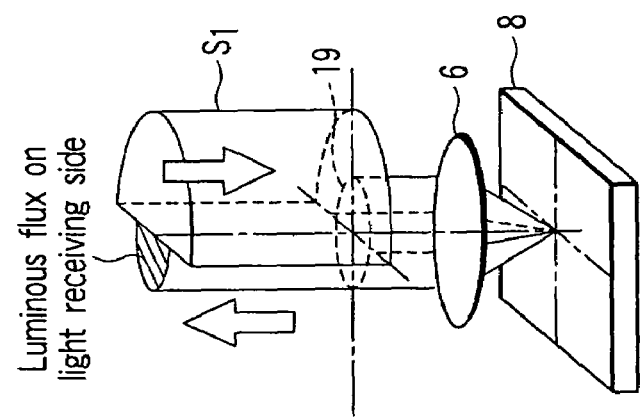
FIG. 14B shows a state in which the luminous flux $S_1$ is transmitted through, for example, an objective lens having the smallest pupil diameter after the luminous flux $S_1$ is transmitted through the objective lens and reflected from the sample.
Figure 14A:
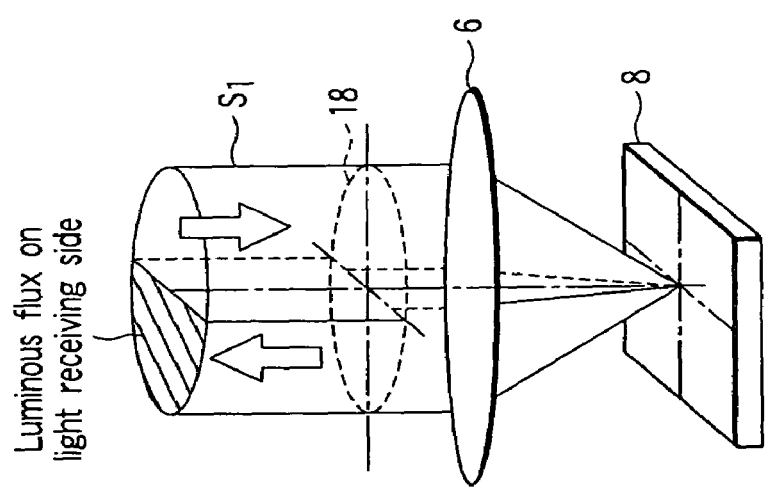
FIG. 14A shows a state in which, for example, in an objective lens having the largest pupil diameter, a luminous flux $S_1$ having an optimum diameter for sufficiently satisfying the largest pupil diameter is transmitted through the objective lens after the luminous flux $S_1$ is transmitted through the objective lens and reflected from the sample.

The image shape in the defocused state in the first embodiment differs from the image shape in the case where the luminous flux deformation member 20 is not arranged as shown in FIG. 13. However, the focus detection sensitivity is not changed. This is because the focus detection sensitivity near the focus position depends on the focal depth at the surface of the photodetector 11. The focal depth is determined by NA of the light beam collected on the photodetector 11.

In the luminous flux collected on the photodetector 11, NA of a component contributing to the focus detection (component perpendicular to the dual partitioning boundary line 16) is not changed as compared with the case where the luminous flux deformation member 20 is not provided, and therefore, the focus detection sensitivity is not changed in the first embodiment. In the light receiving surface of the photodetector 11, a region where the luminous flux is eliminated by the luminous flux deformation member 20 is decreased as the pupil diameter of the objective lens 6 is decreased, and the light receiving state of the first embodiment is bright close to the conventional light receiving state in which the luminous flux deformation member 20 is not provided.

In the first embodiment, for example, when the objective lens 6 having the pupil diameter of 9 mm (the largest pupil diameter 24 of the objective lens 6) and the objective lens 6 having the pupil diameter of 3 mm (the smallest pupil diameter 23 of the objective lens 6) are used, the focus detection is performed while the dimension $L_1$ of the short side of the aperture 21a is set at 3 mm and the dimension $L_2$ of the long side is set at 9 mm. When the objective lens 6 having the pupil diameter of 9 mm and the objective lens 6 having the pupil diameter of 3 mm are used, the light quantity ratio of the projection onto the sample and detection on the light receiving surface of the photodetector 11 becomes about 3.75:1 because the light quantity ratio is proportional to the area ratio of the pupil surface as described above.

In the conventional method, the light quantity ratio is 9:1. On the contrary, in the laser beam transmitted through the objective lens 6 having the pupil diameter of 9 mm, the light quantity ratio of the projection onto the sample 8 and detection on the light receiving surface of the photodetector 11 in the first embodiment can be decreased to the half or less as compared with the conventional method.

Therefore, even if emission intensity of the single semiconductor laser becomes double the conventional one (or even if the laser beam is cut off by the luminous flux deformation member 20), the light quantity is not changed in the case of the laser beam transmitted through the objective lens 6 having the pupil diameter of 9 mm. However, in the case of the laser beam transmitted through the objective lens 6 having the pupil diameter of 3 mm, the light quantity can be increased double or more as compared with the conventional light quantity. Accordingly, the focus detection can be performed for the sample 8 having the reflectivity not more than ½ of the sample 8 which has a reflectivity limit in a laser waveband.

Thus, in the first embodiment, while the focus detection sensitivity is maintained, the difference in light quantity between the projection onto the sample 8 and detection on the light receiving surface of the photodetector 11 can be decreased despite the size of the pupil diameter of the objective lens 6. In the first embodiment, when increasing the quantity of light emitted to the sample 8 through the objective lens having the small pupil diameter, an amplitude degree of the electrical amplification process can be decreased for the signal output from the light receiving surface of the photodetector 11. Accordingly, the first embodiment can improve reliability of the focus error signal to obtain the good focus accuracy when the focus detection is performed to the sample 8 having the low reflectivity, targeted for the conventional focus detection apparatus.

In the first embodiment, the luminous flux deformation member 20 is arranged at the position of conjugation with the pupil of the objective lens 6 or near the position thereof, but the invention is not limited thereto. For example, the same effect can be obtained also when the luminous flux deformation member 20 is arranged between the collimator lens 3 and the dichroic mirror 5.

The shutter 4 and the luminous flux deformation member 20 may be unified to cut off a part of the luminous flux of the passing laser beam. For example, a black mask or the like which is evaporated on a part of the surface of the collimator lens 3 or half mirror 9 can correspond to the region (light cutting off member 26a) which is cut off by the luminous flux deformation member 20. In the first embodiment, the collimator lens 3 or half mirror 9 having the black mask may be used instead of the luminous flux deformation member 20.

In the first embodiment, the luminous flux deformation member 20 is arranged at the position of conjugation with the pupil of the objective lens or near the position thereof. However, the luminous flux deformation member 20 may be arranged at any position between the collimator lens 3 and the dichroic mirror 5 as long as the above-described relationship holds between the dimension of the aperture 21a and the dimension of the pupil diameter of the objective lens 6. The shape of the aperture 21a is not limited to the rectangle, but other shapes including an ellipse may be used as the shape of the aperture 21a.

Figure 6:
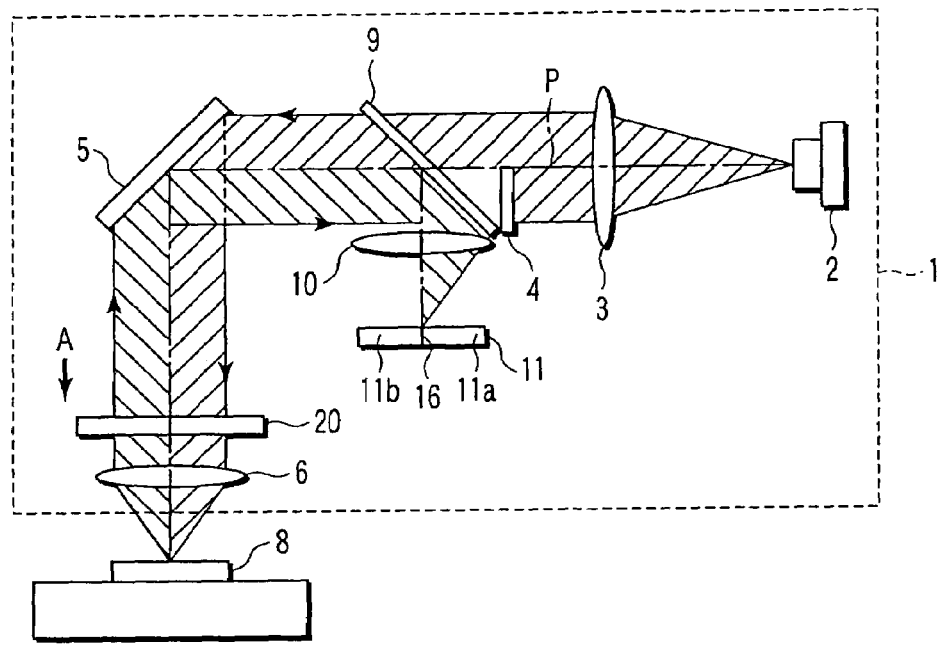
FIG. 6 shows a schematic configuration of an entire focus detection apparatus according to a second embodiment of the present invention.
Figure 7:
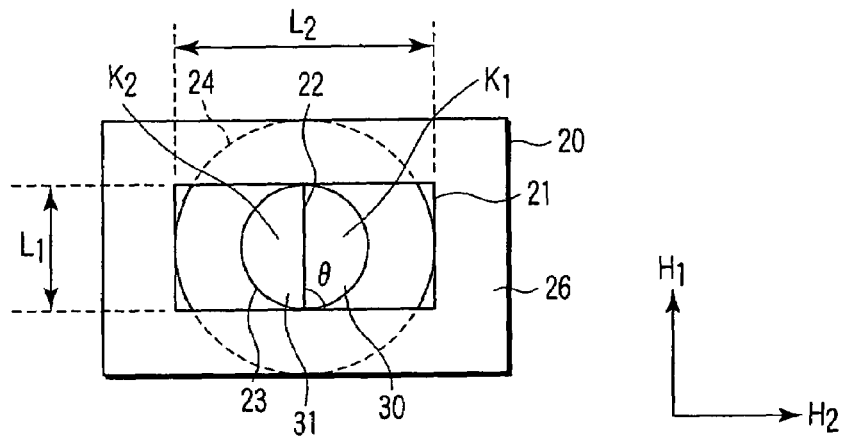
FIG. 7 is a front elevation showing a luminous flux deformation member when viewed from a direction of an arrow A of FIG. 6.

Then, a second embodiment of the present invention will be described with reference to FIGS. 6 and 7. FIG. 6 shows an entire configuration of a focus detection apparatus 1 according to the second embodiment. FIG. 7 is a front elevation showing the luminous flux deformation member 20 when viewed from the direction of the arrow A of FIG. 6.

In the first embodiment, the luminous flux deformation member 20 is arranged at a position of conjugation with a pupil of an objective lens 6 or near the position. On the other hand, in the second embodiment, as shown in FIG. 6, the luminous flux deformation member 20 is arranged at a pupil position of the objective lens 6 or near the pupil position.

The configurations except for the luminous flux deformation member 20 are similar to the single spot method described in the first embodiment, so that the same components as those in the first embodiment are designated by the same numeral, and the detailed description will be omitted.

The luminous flux deformation member 20 of the second embodiment has a rectangular region (hereinafter referred to as light transmission region) 21. The light transmission region 21 has a characteristic of transmitting a light having a wavelengths from an infrared region to a ultraviolet region and emitted from the light source 2. For example, the light transmission region 21 is made of a glass material. The glass material is formed in a plate shape. For example, a mask is formed in an outer peripheral portion of the light transmission region 21. In the mask, the outer peripheral portion of the glass material is partially coated by evaporation or the like. Thus, a light cutting off region 26 is formed in the outer peripheral portion of the light transmission region 21. For example, the light cutting off region 26 has an optical characteristic which transmits only the light having the wavelengths of the ultraviolet region or visible region. For example, the light having the wavelengths of the ultraviolet region or visible region is an illumination light for use in microscope observation. The light cutting off region 26 also has the optical characteristic which cuts off the laser beam emitted from the light source 2 and having the wavelengths of the infrared region, for example. The luminous flux deformation member 20 is an optical filter which has different spectral transmittance in at least the short-side direction in the light transmission region 21.

As shown in FIG. 2, the dimension $L_1$ of the short side of the light transmission region 21 to which the coating is not performed is caused to correspond to the dimension not lower than the smallest pupil diameter 23 of the objective lens 6 which is used in conjunction with the optical system of the focus detection apparatus 1. In the case where the objective lens having the large pupil diameter and the objective lens having the relatively small pupil diameter are used, the luminous flux deformation member 20 decrease the difference in light quantities received on the light receiving surfaces.

It is preferable that the dimension $L_1$ of the short side is formed slightly larger than the smallest pupil diameter 23. Therefore, because the adjustment margin of the luminous flux deformation member 20 is increased, the user (operator) can easily adjust the position of the luminous flux deformation member 20.

Preferably, the dimension $L_2$ of the long side of the light transmission region 21 is caused to correspond to the dimension of the largest pupil diameter 24 of the objective lens 6 which is used in conjunction with the focus detection apparatus 1, or there is no limit to the dimension $L_2$ of the long side as long as the dimension $L_2$ is larger than the dimension of the largest pupil diameter 24.

Now, positioning of the luminous flux deformation member 20 will be described below.

In FIG. 2, a luminous flux 30 shown in a luminous flux region $K_1$ is a luminous flux which is transmitted through the smallest pupil diameter 23 of the objective lens 6 (generally high-magnification objective lens) and incident to the luminous flux deformation member 20. A luminous flux 31 shown in a luminous flux region $K_2$ is a luminous flux in which the luminous flux 30 is reflected from the sample 8 and incident to the luminous flux deformation member 20 again. The luminous flux 30 and the luminous flux 31 travel with the boundary line 22, respectively. The user (operator) positions the luminous flux deformation member 20 such that the angle θ formed by the boundary line 22 and the long-side direction $H_2$ of the light transmission region 21 becomes orthogonal.

Then, the user (operator) moves the luminous flux deformation member 20 in the short-side direction $H_1$ of the light transmission region 21. At this point, the user (operator) moves the luminous flux deformation member 20 such that the whole of the smallest pupil diameter 23 of the objective lens 6 is accommodated in the light transmission region 21, and then, the user (operator) performs the positioning and fixation.

Finally, the user (operator) moves the luminous flux deformation member 20 in the long-side direction $H_2$ of the light transmission region 21. At this point, the user (operator) moves the luminous flux deformation member 20 such that the dimension $L_2$ of the long side of the light transmission region 21 comes into contact with the outer shape of the largest pupil diameter 24 of the objective lens 6 (generally low-magnification objective lens) or such that the dimension $L_2$ of the long side runs over from the dimension of the largest pupil diameter 24, and then, the user (operator) performs the positioning and fixation.

The luminous flux deformation member 20 is arranged at a pupil position of the objective lens 6 or near the pupil position. However, the luminous flux deformation member 20 may be arranged at any position between the objective lens 6 and the dichroic mirror 5 as long as the above-described relationship holds between the dimension of the light transmission region 21 and the dimension of the pupil diameter of the objective lens 6. The shape of the light transmission region 21 is not limited to the rectangle, but other shapes including an ellipse may be used as the shape of the light transmission region 21.

Then, an operation method of the second embodiment will be described.

A laser beam emitted from the light source 2 is converted to a parallel luminous flux by the collimator lens 3. A half of the parallel luminous flux is cut off by the shutter 4. The remaining part of luminous flux which is not cut off is transmitted through the half mirror 9, and is reflected downward by 90° with the dichroic mirror 5. Then, the reflected light passes through the right optical path of the drawing with respect to the optical axis P. As shown in FIG. 3, when the luminous flux passes through the luminous flux deformation member 20, a part of the luminous flux is cut off by the luminous flux deformation member 20. The remaining part of luminous flux which is not cut off is transmitted through the luminous flux deformation member 20. The luminous flux transmitted through the luminous flux deformation member 20 is incident to and transmitted through the objective lens 6. Then, the luminous flux transmitted through the objective lens 6 is collected in a spot shape onto the sample 8 by the objective lens 6.

The light reflected from the sample 8 passes through the left optical path of the drawing with respect to the optical axis P, and is transmitted through the objective lens 6 and the luminous flux deformation member 20 again. Then, the transmitted light is reflected by the dichroic mirror 5 and the half mirror 9, respectively. The reflected light is collected on the photodetector 11 through the condensing lens 10. The reflected light collected is received by the photodetector 11.

Then, a focus detection method in the second embodiment will be described in detail.

In obtaining the focus, the light collecting state in the light receiving surface of the photodetector 11 is similar to that of the first embodiment, and the description will be omitted. In the case where the sample 8 recedes from the objective lens 6 and in the case where the sample 8 is brought close to the objective lens 6, the light collecting state in the light receiving surface of the photodetector 11 is also similar to that of the first embodiment. The focus detection sensitivity near the focused position is also similar to the first embodiment.

Thus, in the second embodiment, the same effects as the first embodiment can be obtained.

Then, a third embodiment of the present invention will be described in detail with reference to the drawings.

Figure 8:
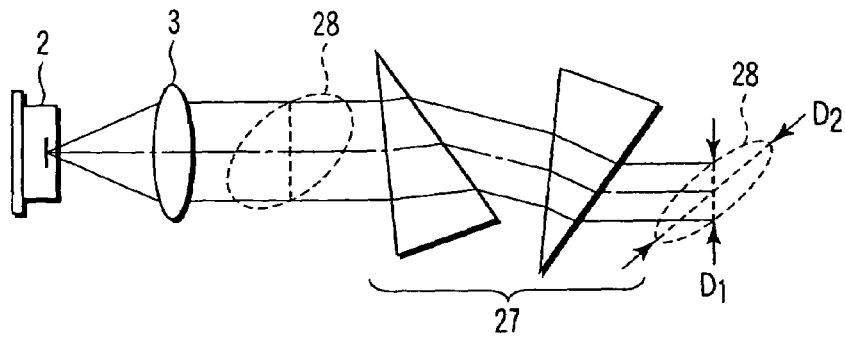
FIG. 8 shows a configuration on an optical path from a collimator lens to a shutter (not shown) in a focus detection apparatus according to a third embodiment of the present invention.

FIG. 8 shows a configuration on the optical path from the collimator lens 3 to the shutter 4 (not shown).

The basic configuration of the third embodiment is the same as the single spot type of optical system in the first embodiment. However, in the configuration near the collimator lens 3, an anamorphic optical system 27 is provided at the back of the collimator lens 3 as shown in FIG. 8. Because other configurations are similar to those shown in FIG. 1, the same component as the first embodiment is designated by the same numeral, and the description will be omitted. Circles expressed by the dotted lines located in front of and at the back of the anamorphic optical system 27 show a luminous flux cross section 28.

The luminous flux cross section 28 which is deformed by the anamorphic optical system 27 can be determined as follows. Preferably, a dimension $D_1$ of the short side is caused to correspond to the smallest pupil diameter 23 of the objective lens 6 which is used in conjunction with the focus detection apparatus 1.

It is preferable that the dimension $D_1$ of the short side is formed slightly larger than the smallest pupil diameter 23. Therefore, because the adjustment margin of the luminous flux deformation member 20 is increased, the user (operator) can easily adjust the position of the luminous flux deformation member 20.

Preferably, the dimension $D_2$ of the long side is caused to correspond to the dimension of the largest pupil diameter 24 of the objective lens 6 which is used in conjunction with the focus detection apparatus 1, or there is no limit to the dimension $D_2$ of the long side as long as the dimension $D_2$ is larger than the dimension of the largest pupil diameter 24.

Positioning of the luminous flux cross section 28 deformed by the anamorphic optical system 27 will be described below.

First, the user (operator) positions the entire configuration shown in FIG. 8 such that an angle formed by a long-side direction of the luminous flux cross section 28 deformed by the anamorphic optical system 27 and the boundary line 22 between the light cutting off and aperture regions becomes orthogonal. The boundary line 22 is formed by the shutter 4 and the conjugate surface of the pupil of the objective lens 6.

Then, the user (operator) moves the entire configuration shown in FIG. 8 in the short-side direction H of the luminous flux cross section 28 deformed by the anamorphic optical system 27. At this point, the user (operator) moves the entire configuration shown in FIG. 8 such that at least the whole of the smallest pupil diameter 23 of the objective lens 6 is accommodated in the luminous flux.

Finally, the user (operator) moves the entire configuration shown in FIG. 8 in the long-side direction of the luminous flux deformed by the anamorphic optical system 27. At this point, the user (operator) moves the entire configuration shown in FIG. 8 such that the end of the luminous flux comes into contact with the outer shape of the largest pupil diameter 24 of the objective lens 6 or such that the end of the luminous flux runs over from the dimension of the largest pupil diameter 24, and then, the user (operator) performs the fixation.

Thus, in the third embodiment, the same effect as the first embodiment can be obtained even if the luminous flux is deformed in the elliptical shape by the anamorphic optical system 27.

In the third embodiment, the light quantity of the laser beam emitted from the light source 2 can be used without avoiding waste by utilizing the anamorphic optical system 27 instead of the luminous flux deformation member 20. Therefore, the third embodiment has the excellent efficiency in the use of the light quantity. Further, even when a cylindrical lens system 29 shown in FIG. 9 or a holographic optical element (not shown) is arranged instead of the anamorphic optical system 27, the same effect can be obtained in the third embodiment.

The anamorphic optical system 27 is arranged between the collimator lens 3 and the shutter 4. However, the anamorphic optical system 27 may be arranged at any position between the collimator lens 3 and the dichroic mirror 5 as long as the above-described relationship holds between the dimension of the pupil diameter of the objective lens 6 and the dimension of the luminous flux shape deformed by the anamorphic optical system 27.

Next, a fourth embodiment of the present invention will be described in detail. In the fourth embodiment, the same components as those in the first embodiment are designated by the same numerals, and the detailed description will be omitted.

The first to third embodiments are formed by the single spot method in which the focus is obtained by collecting the light from the light source 2 onto the one point on the sample 8. However, the invention is not limited to the single spot method. For example, the invention may be adopted the multi-spot method in which many spots are generated to the sample.

FIGS. 10A, 10B and 10C show a schematic configuration for use in a multi-spot method in which a diffraction grating 35 is arranged in the focus detection apparatus shown in the second embodiment. FIG. 10A shows the schematic configuration in which the multi-spot method is used, FIG. 10B is a view of FIG. 10A when the apparatus is viewed from a direction of the arrow A, and FIG. 10C is a view of FIG. 10A when the apparatus is viewed from a direction of the arrow B. In the fourth embodiment, the diffraction grating 35 is provided between the collimator lens 3 and the shutter 4. Further, in the fourth embodiment, the luminous flux deformation member 20 is provided at the pupil position of the objective lens or near the pupil position.

A laser beam is emitted from the light source 2, and is converted to a parallel luminous flux by the collimator lens 3. The diffraction grating 35 outputs the laser beams at plural different angles. The laser beams output from the diffraction grating 35 are reflected downward by 90° with the dichroic mirror 5. Parts of the reflected light beams are cut off by the luminous flux deformation member 20. The remaining part of reflected light beams which are not cut off are incident to the objective lens 6 with plural different angles, and are transmitted through the objective lens 6. The transmitted light beams are collected in the spot shapes onto the plural points on the sample 8 by the objective lens 6. The light beams reflected from the sample 8 are transmitted through the objective lens 6 and the luminous flux deformation member 20 again, and the light beams are reflected by the dichroic mirror 5 and the half mirror 9, and are collected in the plural points on the photodetector 11 by the condensing lens 10.

The diffraction grating 35 generates the plural spots at different focal positions in the surface of the sample 8. A semiconductor device having a step not smaller than the focal depth can be cited as an example of the sample 8 in the fourth embodiment. Therefore, in the fourth embodiment, the light beams can be collected on the step surfaces of the semiconductor device which is of the sample. Accordingly, in the fourth embodiment, the focus position can further be stabilized on the photodetector 11. The focused state and the defocused state can be determined in the same manner as the description of FIG. 5.

Next, a fifth embodiment of the present invention will be described in detail with reference to the drawing. In the fifth embodiment, the same components as those in the above embodiments are designated by the same numerals, and the detailed description will be omitted.

FIGS. 11A, 11B and 11C show a configuration of a multi-spot method in which the diffraction grating 35 is arranged in the first embodiment. FIG. 11A shows a schematic configuration in which the multi-spot method is used, FIG. 11B is a view of FIG. 11A when the apparatus is viewed from a direction of the arrow A, and FIG. 11C is a view of FIG. 11A when the apparatus is viewed from a direction of the arrow B.

In the fifth embodiment, the diffraction grating 35 is provided between the collimator lens 3 and the shutter 4 and at the position of conjugation with the pupil of the objective lens or near the position.

A laser beam is emitted from the light source 2, and is converted to a parallel luminous flux by the collimator lens 3. The diffraction grating 35 outputs the laser beams at plural different angles. Parts of the laser beams output from the diffraction grating 35 are cut off by the luminous flux deformation member 20. The remaining part of reflected light beams which are not cut off are reflected toward the side of the objective lens arranged in the lower portion, by the dichroic mirror 5. The reflected light beams are incident to the objective lens 6, and are transmitted through the objective lens 6. The transmitted light beams are collected in the spot shapes onto the plural points on the sample 8 by the objective lens 6. The light beams reflected from the sample 8 are transmitted through the objective lens 6 again, and the light beams are reflected by the dichroic mirror 5 and the half mirror 9, and are collected in the plural points on the photodetector 11 by the condensing lens 10.

In the fifth embodiment, the same effect as the fourth embodiment can be obtained. In the fifth embodiment, the diffraction grating 35 is provided between the collimator lens 3 and the luminous flux deformation member 20. However, in the fifth embodiment, the same effect can be obtained even if the diffraction grating 35 is arranged between the collimator lens 3 and the shutter 4.

Alternatively, in the surface of the optical element such as the collimator lens 3 and the half mirror 9 which is provided in the optical path, for example, a black mask or the like which reflects and absorbs the light is evaporated, and a slit aperture is provided. Therefore, the luminous flux deformation member 20 which partially cuts off the luminous flux of the light beam emitted from the light source 2 may be formed as described above.

In the fifth embodiment, the anamorphic optical system 27 or cylindrical lens system 29 shown in the third embodiment may be arranged on the optical path from the collimator lens 3 to the shutter 4.

In the configurations of the above embodiments, a set of lenses may be arranged to form a relay optical system on the optical path between the collimator lens 3 and the dichroic mirror 5, the optical path between the dichroic mirror 5 and the objective lens 6, or the optical path between the half mirror 9 and the condensing lens 10.

The luminous flux deformation member 20 of the invention may be detachably attached to the optical path of the focus detection apparatus 1. Plural luminous flux deformation members 20 are prepared according to the different types of the objective lenses, and the members 20 may be formed in a turret shape to correspond to the switching of the objective lenses.

A liquid crystal device is used as the luminous flux deformation member 20 of the invention, and the transmission region and the light cutting off region may arbitrarily be controlled to cut off a part of the luminous flux by applying voltage.

The invention is not limited to the focus detection method of the above embodiments, but the invention can also be applied to other focus detection methods such as a focus detection method in which focusing the sample is automatically detected.

The various inventive steps are includes in the above embodiments, and various changes and modifications could be made by an appropriate combination of the plural disclosed constituent elements. For example, even if some constituent elements are eliminated from all the constituent elements shown in the above embodiments, the configuration in which some constituent elements are eliminated can be extracted as the invention when the problem to be solved can be solved to obtain the effect of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus detection apparatus having a luminous flux deformation member, the focus detection apparatus comprising:
   a light source which emits a luminous flux for focus detection to a sample;
   a photodetector which receives the luminous flux through an objective lens, the luminous flux being reflected from the sample;

a focus detection unit which detects a focus based on a quantity of received light of the luminous flux received by the photodetector; and a luminous flux deformation unit which reduces the dependence of an amount of light received in the photodetector on a size of a pupil diameter of the objective lens by deforming a sectional shape of the luminous flux incident to the objective lens arranged on an optical axis of the luminous flux.

2. A focus detection apparatus according to claim 1, further comprising a plurality of objective lenses having different pupil diameters.

3. A focus detection apparatus according to claim 2, wherein said plurality of objective lenses each has a first objective lens having a first pupil diameter, and a second objective lens having a second pupil diameter relatively smaller than the first pupil diameter of the first objective lens.

4. A focus detection apparatus according to claim 2, wherein the luminous flux deformation unit has a light cutting off unit which cuts off a part of the luminous flux, and the light cutting off unit decreases a difference between the quantity of light received in the case of use of the first objective lens and the quantity of light received in the case of use of the second objective lens.

5. A focus detection apparatus according to claim 3, wherein the luminous flux deformation unit deforms the sectional shape of the luminous flux into a first size substantially equal to at least the first pupil diameter of the first objective lens, and also deforms the sectional shape of the luminous flux into a second size larger than at least the second pupil diameter of the second objective lens in a direction orthogonal to the first size.

6. A focus detection apparatus according to claim 3, wherein the luminous flux deformation unit has a transmission unit which transmits the luminous flux, one side of the transmission unit is substantially equal to at least the first pupil diameter of the first objective lens, and the other side of the transmission unit is larger than at least the second pupil diameter of the second objective lens, the other side being orthogonal to the one side.

7. A focus detection apparatus according to claim 1, wherein the luminous flux deformation unit includes a light cutting off unit which cuts off the luminous flux and an aperture through which the luminous flux passes.

8. A focus detection apparatus according to claim 7, wherein the luminous flux deformation unit is arranged at a pupil conjugation position of the objective lens or near the position.

9. A focus detection apparatus according to claim 1, wherein the luminous flux deformation unit includes an optical filter having:
   a transmission unit which transmits the luminous flux for focus detection; and
   a light cutting off unit which cuts off the luminous flux.

10. A focus detection apparatus according to claim 9, wherein the luminous flux deformation unit is arranged at a pupil position of the objective lens or near the pupil position.

11. A focus detection apparatus according to claim 9, wherein the luminous flux deformation unit includes an anamorphic optical system.

12. A focus detection apparatus according to claim 1, wherein the luminous flux deformation unit includes a cylindrical optical system.

13. A focus detection apparatus according to claim 1, wherein the luminous flux deformation unit is arranged at a pupil position of the objective lens, at a pupil conjugation position of the objective lens, near the pupil position, or near the pupil conjugation position.

14. A focus detection apparatus according to claim 1, further comprising:
   a parallel optical system which converts the luminous flux emitted from the light source, into a parallel luminous flux;
   a condensing optical system which collects the luminous flux reflected from the sample, onto the photodetector through the objective lens; and
   a shutter which cuts off a half of the luminous flux by a line passing through an optical axis of the luminous flux,
   wherein the photodetector includes a dual partitioning detector.

15. A focus detection apparatus according to claim 14, wherein the shutter and the luminous flux deformation unit are integrally formed.

16. A focus detection apparatus according to claim 14, further comprising a diffraction grating arranged on an optical path of the parallel optical system, the diffraction grating emitting the incident parallel luminous fluxes at plural different angles.

17. A focus detection apparatus having a luminous flux deformation member, the focus detection apparatus comprising:
   a light source which emits a first luminous flux;
   a parallel luminous flux converting unit which converts to a parallel luminous flux the first luminous flux emitted from the light source;
   a light cutting off unit which cuts off a half of the parallel luminous flux by a line passing though an optical axis of the parallel luminous flux;
   an objective lens which collects the parallel luminous flux not cut off by the light cutting off unit, onto a sample;
   a light partitioning element which partitions a second luminous flux reflected from the sample through the objective lens;
   a condensing optical system which collects the luminous flux reflected by the light partitioning element;
   a detection unit arranged at a focus position of the condensing optical system, the detection unit having at least two photodetectors which receive the second luminous flux;
   a focus detection unit which detects a focus based on a quantity of received light of the second luminous flux received by the photodetector;
   a first optical path in which the first luminous flux emitted from the light source reaches the sample;
   a second optical path in which the second luminous flux reflected from the sample reaches the photodetector through the condensing optical system; and
   a luminous flux deformation unit which deforms a sectional shape of the first luminous flux traveling on the first optical path,
   wherein the luminous flux deformation unit is arranged on the optical axis of the first luminous flux, and deforms the sectional shape of the first luminous flux at an interface between the first luminous flux and the second luminous flux in a substantially symmetrical shape in relation to an axis orthogonal to the interface and the optical axis.

18. A focus detection apparatus having a luminous flux deformation member, the focus detection apparatus comprising:
   a light source which emits a first luminous flux;
   a parallel luminous flux converting unit which converts to a parallel luminous flux the first luminous flux emitted from the light source;

a light cuffing off unit which cuts off a half of the parallel luminous flux by a line passing though an optical axis of the parallel luminous flux;

a plurality of objective lenses which collect the parallel luminous flux not cut off by the light cutting off unit, onto a sample;

a light partitioning element which partitions a second luminous flux reflected from the sample though the objective lens;

a condensing optical system which collects the luminous flux reflected by the light partitioning element;

a detection unit arranged at a focus position of the condensing optical system, the detection unit having at least two photodetectors which receive the-second luminous flux;

a focus detection unit which detects a focus based on a quantity of received light of the second luminous flux received by the photodetector;

a first optical path in which the first luminous flux emitted from the light source reaches the sample;

a second optical path in which the second luminous flux reflected from the sample reaches the photodetector through the condensing optical system; and a luminous flux deformation unit which deforms a sectional shape of the first luminous flux traveling on the first optical path, wherein the plurality of objective lenses each have a first objective lens having a first pupil diameter and a second objective lens having a second pupil diameter relatively smaller than the first pupil diameter of the first objective lens.

19. A focus detection apparatus according to claim 18, wherein, in the sectional shape of the luminous flux deformed by the luminous flux deformation unit, a first size substantially equal to the second pupil diameter of the second objective lens is formed in a direction of the interface between the first optical path and the second optical path, and a second size not lower than the first pupil diameter of the first objective lens is formed in a direction of a plane perpendicular to the interface between the first optical path and the second optical path.

* * * * *